United States Patent [19]
Cirjak et al.

[11] Patent Number: 5,866,502
[45] Date of Patent: Feb. 2, 1999

[54] PROCESS FOR THE PREPARATION OF ANTIMONATE CATALYSTS FOR (AMM) OXIDATION OF ALKANES AND ALKENES

[75] Inventors: Larry Michael Cirjak, Burton Township; Marc Anthony Pepera, Northfield Center Township, both of Ohio

[73] Assignee: The Standard Oil Co., Cleveland, Ohio

[21] Appl. No.: 835,042

[22] Filed: Mar. 27, 1997

[51] Int. Cl.$^6$ .............................. B01J 23/16; B01J 23/18; B01J 23/20
[52] U.S. Cl. ............................................. 502/353; 502/354
[58] Field of Search ....................... 502/353, 354

[56] References Cited

U.S. PATENT DOCUMENTS

| | | | |
|---|---|---|---|
| 3,686,138 | 8/1972 | Yoshino | 252/456 |
| 4,746,641 | 5/1988 | Guttmann et al. | 502/202 |
| 4,788,317 | 11/1988 | Guttmann et al. | 558/319 |

*Primary Examiner*—Michael Lewis
*Assistant Examiner*—Alexander G. Gmyka
*Attorney, Agent, or Firm*—Michael F. Esposito; David J. Untener

[57] ABSTRACT

A method of preparing a $V_aSb_bM_mN_nO_x$ catalyst useful in the ammoxidation of a $C_2$–$C_5$ hydrocarbon to its corresponding α, β unsaturated nitrile comprising heating an aqueous mixture comprising $V_2O_5$ and $Sb_2O_3$ at a temperature above about 100° to 250° C., preferably 110° to 175° C., most preferably 120° to 160° C., under autogenous pressure with agitation to form a catalyst precursor, drying the catalyst precursor and calcining the catalyst precursor to form the finished catalyst.

20 Claims, No Drawings

PROCESS FOR THE PREPARATION OF ANTIMONATE CATALYSTS FOR (AMM) OXIDATION OF ALKANES AND ALKENES

BACKGROUND OF THE INVENTION

FIELD OF THE INVENTION

This invention relates to the catalytic ammoxidation of paraffins and olefins containing from two to five carbon atoms to the corresponding alpha, beta unsaturated nitrites. In particular, the present invention is directed to the process of making a catalyst useful in the ammoxidation of propane or propylene to acrylonitrile.

Because of the price differential between propylene and propane, an economic incentive exists for the development of viable catalyst useful for the conversion of propane to acrylonitrile. The development of a propane ammoxidation process to acrylonitrile has been quite elusive. The following U.S. Pat. Nos. 5,214,016; 5,008,427; 5,258,543; 4,788,317; 4,746,641; 3,860,534; 3,681,421 and Great Britain Patents 1,336,135 and 1,336,136 are directed to various vanadium antimony type catalysts useful in the ammoxidation of propane to acrylonitrile and teach various methods of making the catalysts. The present invention is directed to a simple procedure for the preparation of vanadium antimony catalyst useful in oxidation and/or ammoxidation reactions such as o-xylene oxidation to phthalic anhydride or propylene and propane ammoxidation to acrylonitrile. In particular, the process of the present invention is directed to the manufacture of a catalyst useful in propane ammoxidation. The beauty of the process of the present invention is that it is a very simple procedure substantially eliminating the exotic materials used in previous procedures as well as eliminating many of the steps set forth in the previous procedures. This, of course, leads to a more economical and commercially viable procedure for the preparation of the catalyst useful in propane and propylene ammoxidation.

SUMMARY OF THE INVENTION

It is the primary object of the present invention to provide a process for the preparation of a catalyst useful in the ammoxidation of olefins and/or paraffins to the corresponding unsaturated nitrites.

It is a secondary object of the present invention to provide a process for the preparation of catalyst useful in ammoxidation of propane or propylene to acrylonitrile.

It is another object of the present invention to provide a process for the preparation of acrylonitrile from propane or propylene utilizing a vanadium antimony promoted catalyst prepared by a specific procedure.

Additional objects, advantages and novel features of the invention will be set forth in part in the description which follows, and, in part, will become apparent to those skilled in the art upon examination of the following or may be learned by the practice of the invention. The objects and advantages of the invention may be realized and obtained by means of the instrumentalities and combinations particularly pointed out in the appended claims.

To achieve the foregoing objects in accordance with the purposes of the present invention as embodied and described therein, the method of the present invention comprises the preparation of a catalyst having the following empirical formula:

$$V_a Sb_b M_m N_n O_x$$

where a=0.01 to 2
b=0.5 to 4
m=0.01 to 3, and
n=0 to 1 where

M=Sn, Ti, Fe, Cu, Mn, Ga or mixtures thereof
N=Li, Mg, Sr, Ca, Ba, Co, Ni, Zn, Ge, Nb, Zr, Mo, W, Cr, Te, Ta, Se, Bi, Ce, In, As, B or mixtures thereof comprising heating an aqueous mixture comprising a water soluble vanadate and $Sb_2O_3$ and, optionally, at least one M promoter to a temperature of between the reflux temperature of the aqueous mixture (i.e. above about 100° C.) to 250° C., preferably between about 110° to 250° C., under autogenous pressure with agitation for a time sufficient to allow at least the slightly water soluble vanadate and $Sb_2O_3$ to react to form a catalyst precursor, drying the catalyst precursor to remove the water and calcining the catalyst precursor to produce the finished catalyst.

In a further aspect of the present invention, a process for the preparation of a $V_a Sb_b O_x$ promoted catalyst having the following formula:

$$V_a Sb_b M_m N_n O_x$$

where a=0.01 to 2
b=0.5 to 4
m=0.01 to 3, and
n=0 to 1 where

M=Sn, Ti, Fe, Cu, Mn, Ga or mixtures thereof
N=Li, Mg, Sr, Ca, Ba, Co, Ni, Zn, Ge, Nb, Zr, Mo, W, Cr, Te, Ta, Se, Bi, Ce, In, As, B or mixtures thereof comprising heating the aqueous mixture comprising $V_2O_5$ and $Sb_2O_3$ and, optionally, at least one M promoter to a temperature between 125° to 250° C. under autogenous pressure with agitation for a time sufficient to allow at least the $V_2O_5$ and $Sb_2O_3$ to react to form a catalyst precursor, drying the catalyst precursor to remove the water, and calcining the catalyst precursor to produce the catalyst.

In a preferred embodiment of the process of the present invention, at least one promoter N as defined above is added to the aqueous mixture prior to heating the aqueous mixture to form the catalyst precursor.

In a still further preferred embodiment of the present invention, at least one promoter element M is added to the aqueous mixture subsequent to heating the aqueous mixture to form the catalyst precursor.

In a still further preferred embodiment of the present invention, the M promoter is selected to be tin, and the tin promoter is added to the aqueous mixture in the form of a tin oxide sol.

In another preferred embodiment of the present invention, the aqueous mixture is maintained at a pH of less than 7 by the addition of an acid. The acid may be selected from either inorganic or organic acids.

In still another preferred embodiment of the present invention, the aqueous mixture is maintained at a pH of greater than 7 by the addition of a base. Preferably, the base is an organic or inorganic amine (e.g. alkanolamine, tetraethylammonium hydroxide).

The process of the present invention will now be set forth in detail.

DETAILED DESCRIPTION OF THE INVENTION

The present invention is directed to a method of preparing $V_a Sb_b O_x$ based catalyst for the ammoxidation of hydrocarbons, particularly $C_3$ to $C_5$ alkanes and olefins to the corresponding alpha-beta unsaturated nitriles. In particular, the present invention relates to the preparation of vanadium antimonate based catalysts for the ammoxidation of propane and propylene to acrylonitrile. The process of the present invention comprises preparing a catalyst having the following empirical formula:

$$V_aSb_bM_mN_nO_x$$

where
 a=0.01 to 2
 b=0.5 to 4
 m=0.01 to 3, and
 n=0 to 1
where M=Sn, Ti, Fe, Cu, Mn, Ga or mixtures thereof
 N=Li, Mg, Sr, Ca, Ba, Co, Ni, Zn, Ge, Nb, Zr, Mo, W, Cr, Te, Ta, Se, Bi, Ce, In, Ar, B or mixtures thereof
comprising heating an aqueous mixture comprising water soluble vanadates (e.g. $VO_4^{-3}$, $VO_3^{-1}$, $V_2O_5$) and $Sb_2O_3$ and, optionally, at least one M promoter to a temperature of above the reflux temperature of the aqueous mixture to 250° C. under autogenous pressure with agitation for a time sufficient to allow at least the slightly water soluble vanadates and $Sb_2O_3$ to react to form a catalyst precursor, drying the catalyst precursor to remove the water, and calcining the catalyst precursor to produce the finished catalyst.

In a further embodiment of the process of the present invention, the M promoter is added to the aqueous mixture after the water soluble vanadates and $Sb_2O_3$ have been mixed and allowed to react.

In a further aspect of the present invention, the process for the preparation of a $V_aSb_bM_mN_nO_x$ catalyst having the formula set forth above comprises heating an aqueous mixture comprising $V_2O_5$ and $Sb_2O_3$ to a temperature between 110° to 250° C. under autogenous pressure with mixing for a time sufficient to allow the metal oxides to react to form a catalyst precursor, adding at least one M promoter to the aqueous mixture, drying the catalyst precursor to remove the water and calcining the catalyst precursor to produce the catalyst.

The hydrothermal reaction of the metal oxides in the aqueous solution is continued for a time period sufficient for the metal oxides to suitably react to form the catalyst precursor. The required reaction time is ultimately determined by the catalytic and physical properties of the final material obtained after calcination. Typically, the reaction is continued for between 0.5 to 100 hrs, preferably from 1 to 50 hrs, especially preferred being 1 to 10 hrs. It has been observed that shorter reaction times are required as one increases the temperature employed during the catalyst precursor formation.

The aqueous mixture containing the vanadium and antimony components may also contain an acid or base, preferably a base present with the tin oxide sol.

Any inorganic or organic acid may be employed for adjustment of the pH below 7. It is more desirable to employ acids that can be decomposed during calcination such that they do not leave behind non-volatile components such as chloride, or sulfate that can modify the composition, unless that is desired. Inorganic acids such as nitric acid can be employed, however these acids can evolve environmentally unacceptable gases such as $NO_x$. It is envisioned that the preferred acids are organic acids such as acetic acid, citric acid or oxalic acid that decompose to produce $CO_x$ and water upon calcination. The amount of acid that is employed in these syntheses is significantly below that which is required to dissolve all of the inorganic components, (e.g. $V_2O_5$) prior to reaction.

Any inorganic base (e.g. ammonium hydroxide) or organic amine (including diethoxyethylamine, tetramethylalkylammonium hydroxide, alkanolamines, t-butylammonium hydroxide) can be employed to adjust the pH above 7. However, it is more desirable to employ bases that can be decomposed during calcination such that they do not leave behind non-volatile components such as the alkali or alkaline earth metals unless it is desired for them to be present in the final catalyst composition. Suitable bases that can be employed are ammonium hydroxide and organic bases such as alkylamines and alkanolamines. Most preferably, the base may already be present in the aqueous mixture as a stabilizer/dispersant for the hydrated inorganic metal oxide (e.g. tin oxide sol) which has been used as the raw material source for the M promoter during the formation of the catalyst precursor and, therefore, will not have to be added separately.

The procedure of the present invention may comprise the reaction of the appropriate amounts of $V_2O_5$ and $Sb_2O_3$, (as well as optionally other metal oxides known to promote ammoxidation catalysis such as but not limited to those based upon tin oxide (sol), titanium, tellurium, rhenium, silicon, aluminum, iron, niobium, chromium, cobalt, copper, bismuth, tungsten, etc) in the presence of water and optionally an acid or base to adjust pH at a temperature of 100° C. (reflux temperature) up to 250° C. under autogenous pressure with vigorous stirring. In cases where the promoter metal oxide itself cannot be made to react hydrothermally (or is not readily available in a suitable form), other sources of the metal promoters (e.g. nitrates, acetates, hydroxides, ammonium ion complexes, carbonyls, etc.) can optionally be employed. The hydrothermal reaction of these metal oxides is continued for a time period (typically 0.5 to 100 hrs) sufficient for the metal oxides to suitably disperse to form the catalyst precursor. Some metal oxides or other sources may be added subsequent to the hydrothermal reaction step and can be in the form of fine metal powders, sols or complexes. Examples of these are fumed $TiO_2$, tin oxide sol, silica sol, and alumina sol. Upon cooling, the material obtained (typically a fairly homogeneous slurry, although some segregation can occur if left standing without agitation) can be mixed/further reacted with additional metal oxides (or other metal sources such as nitrates, acetates, etc.), evaporated to dryness (or spray dried) and calcined in one or more steps to produce the final catalyst. The pH of the hydrothermally prepared slurry may have to be adjusted prior to the addition of the other reagents for the optimal preparation of the catalyst.

The required reaction time, temperature, solids content, and order of addition of other metal oxide reagents is ultimately determined by the catalytic and physical properties of the final material produced. Further washing and calcination steps as utilized for catalysts prepared by other routes can also be employed to improve the performance of these catalysts. For example, the washing and calcination steps disclosed in U.S. Pat. Nos. 5,214,016, 5,008,427 and 5,258,543, herein incorporated by reference, may be utilized to improve the performance of the catalyst. The addition of alkali such as lithium hydroxide to reduce the viscosity of the slurry prior to spray drying is also applicable to slurries prepared by this route.

It has been found that the presence of the tin promoter in the form of tin oxide sol/stabilizers during the hydrothermal synthesis of promoted catalyst precursor is advantageous, especially at above reflux ($\approx$100° C.) to 250° C. (e.g. 110° to 250° C.), preferably 110° to 175° C., most preferred being 120° to 160° C., under autogenous pressure.

In addition, the preparation of high solids content aqueous slurries are envisioned as particularly beneficial to the practice of the present invention. The use of tetramethylammonium hydroxide stabilized $SnO_2$ sol may be utilized to obtain aqueous slurries in the range of 70% solids which are suitable in the practice of the invention.

Conducting the hydrothermal reaction step at elevated temperatures reduces the time needed to prepare slurries that ultimately yield catalysts that are as good or better than those prepared under reflux (approximately 100° C.). It is also felt that operation at elevated temperatures (temperatures above reflux, i.e. above 100° C.) enhances the incorporation of other promoter elements into the base composition to improve overall performance. Moreover, the process of the present invention is readily scaleable for commercial catalyst manufacture because it is not necessary for all of the starting materials to be in solution at any one point in time. Therefore, higher solids concentrations of the slurries can be attained without the expense of concentration by, for example, evaporation prior to spray drying. This increases the utilization efficiency of reactors and other equipment utilized in the preparation of catalyst. The procedure of the present invention also reduces the amount of water that must be evaporated off of the slurry in order to attain the appropriate solids content for spray drying, thereby resulting in time and energy savings.

It has also been observed that the rate of the reaction of the metal oxides under higher temperatures and autogenous pressure has been significantly enhanced by the presence of tin promoter in the form of a tin oxide sol. In particular, the metal oxide reaction in the presence of tin oxide sol, i.e. Nalco 88-SN-123 and Nalco TX7684, supplied by the Nalco Chemical Co., Naperville, Ill., is significantly enhanced. This permits the preparation of catalysts (precursors) using shorter reaction times and lower reaction temperatures than had been employed previously.

There are qualitative factors that indicate that the presence of the tin oxide sol accelerates the rate of the reacton of vanadium and antimony oxides. In the absence of the tin oxide sol, the color of the refluxed mixture does not darken appreciably (and yellow streaking is observed when a drop of slurry is placed on a piece of the filter paper indicative of free and soluble vanadium containing species) until after 3–6 hrs reaction time. In the presence of tin oxide sol, the color is black within ~½ hr indicating substantial reaction. XRD analysis of intermediate calcined materials (650° C.) indicates that the tin oxide and titanium oxide are better dispersed if the tin oxide sol was present during the hydrothermal step. The presence of organic stabilizers in the tin oxide sol can be detrimental to final catalyst performance unless special precautions are taken to remove the stabilizer before final calcination. Accordingly, there will be certain advantage to employing low levels of the stabilizer and or ones that volatilize readily. The volatility of the stabilizer is not a problem during synthesis when using the process of the present invention which utilizes a sealed system at autogenous pressure.

The most simple and convenient means of utilizing the procedure of the present invention under basic conditions is to have the tin sol, and accompanying stabilizers/dispersants, present during the hydrothermal reaction step of the vanadium and antimony oxides. This could be an advantage with respect to minimizing migration of the tin oxide particles to the surface of particles formed during spray drying to prepare the catalyst in the fluid bed form.

The following examples are set forth below for illustrative purposes only.

Fixed Bed Propylene Ammoxidation

EXAMPLE 1

A catalyst of composition 60% $VSb_{1.2}Fe_{0.08}Sn_{0.5}Ti_1O_x$–40% $SiO_2$ was prepared in the following manner. 4.55 g of $V_2O_5$ (Stratcore), 8.75 g of $Sb_2O_3$, 0.32 g of $Fe_2O_3$ (Baker) and 40 g of water were placed in a Teflon liner to fit a Parr 125 mL bomb equipped with a magnetic stir bar. After stirring for approximately 15 minutes, 1.58 g of oxalic acid (Baker) and 20 g of additional water were added with continued stirring. The liner was then sealed in the bomb casing and placed in a 175° C. oven. The slurry obtained after 93 hrs was transferred to an 800 mL beaker eqipped with a stir bar and diluted with water to approximately 150 mL. 4.00 g of $TiO_2$ (Degussa P25) was added to the slurry and stirred for approximately 1 hr. The mixture was then heated to boiling. 18.84 g of $SnO_2$ sol (20% solids) and 47.50 g of $SiO_2$ sol (30% solids) were then added and water was evaporated until the gel thickened such that the stir bar stopped. The material obtained was then dried in an oven at 120° C. overnight. The solid obtained was then calcined in air at 290° C. for 3 hrs, 425° C. for 3 hrs, and 650° C. for 8 hrs. The material was then ground and sieved and a portion of the 20–40 mesh portion was calcined at 900° C. for 3 hrs, washed with hot methanol, then calcined at 650 C. for 3 hrs and then washed with hot methanol.

EXAMPLE 2

A catalyst of composition 60% $VSb_{1.2}Fe_{0.08}Sn_{0.5}Ti_1O_x$–40% $SiO_2$ was prepared as above except that the $TiO_2$ was present during the 93 hr hydrothermal reaction step at 175° C.

EXAMPLE 3

A catalyst of composition 60% $VSb_{1.2}Fe_{0.025}Nb_{0.025}Sn_{0.5}Ti_1O_x$–40% $SiO_2$ was prepared in a similar manner to Example 1 with 0.10 g of $Fe_2O_3$ and 0.17 g of $Nb_2O_5$ (Alfa) present in the hydrothermal reaction step (175° C., 138 hrs) without oxalic acid.

EXAMPLE 4

A catalyst of composition 60% $VSb_{1.2}Cu_{0.04}Sn_{0.5}Ti_1O_x$–40% $SiO_2$ was prepared in a similar manner to Example 1 with 0.14 g of $Cu_2O$ (Alfa) present during the hydrothermal reaction step (175° C., 91 hrs)

EXAMPLE 5

A catalyst of composition 60% $VSb_{1.2}Cu_{0.04}Sn_{0.5}Ti_1O_x$–40% $SiO_2$ was prepared in a similar manner to Example 4 with 0.16 g of CuO (Alfa) present during the hydrothermal reaction step.

EXAMPLE 6

A catalyst of composition 60% $VSb_{1.2}Cu_{0.04}Sn_{0.5}Ti_1O_x$–40% $SiO_2$ was prepared in a similar manner to Example 4 with 0.16 g of CuO (Alfa) present during the hydrothermal reaction step.

EXAMPLE 7

A catalyst of composition 60% $VSb_{1.2}Cu_{0.06}Sn_{0.5}Ti_1O_x$–40% $SiO_2$ was prepared in a similar manner to Example 4 with 0.24 g of CuO (Alfa) and only 0.79 g of oxalic acid present during the hydrothermal reaction step.

EXAMPLE 8
60% $VSb_{1.2}Fe_{0.08}Sn_{0.5}Ti_1O_x$–40% $SiO_2$

A mixture of $V_2O_5$ (4.55 g), $Sb_2O_3$ (8.75 g), $Fe_2O_3$ (Nanocat(R), hereinafter referred to as "Nano") from Mach 1 Company, located in Pennsylvania, 0.32 g), 18.84 g tin oxide sol (3.77 g $SnO_2$) and 125 ml water were reacted under reflux for ~24 hrs. After cooling, 4.00 g $TiO_2$ and 47.50 g of silica sol (30% solids) were added and the slurry was thickened on a hotplate until the stir bar stopped. The high temperature calcination was at 885° C. for 3 hrs.

Comparative Example 9
60% $VSb_{1.3}Fe_{0.2}Sn_{0.5}Ti_1O_x$–40% $SiO_2$

A catalyst having the empirical formula 60% $VSb_{1.3}Fe_{0.2}Sn_{0.5}Ti_1O_x$–40% $SiO_2$ was made as follows: 12.08 g $V_2O_5$ was added to a mixture consisting of 900 cc $H_2O$ and 100 g of 30% $H_2O_2$ in a 2-liter beaker, and stirred at room temperature about 15 minutes, until a dark red peroxy complex had formed. 25.17 g of $Sb_2O_3$, 2.12 g $Fe_2O_3$ (Nano) and 10.61 g $TiO_2$ (Degussa, P-25) were then added, the hot plate temperature control was set to "high," and the beaker was covered with a watchglass. As it heated, the color of the slurry changed from yellow to green to black. The mixture was digested for approximately 4.5 hrs; water was added occasionally to keep the volume constant. 50.05 g of a 20% $SnO_2$ sol (Nalco 88SN123) was added, followed by 133.33 g of 30% silica sol (Nissan). The catalyst slurry was evaporated on the hot plate with constant stirring until it thickened. The rest of the procedure was the same as Example 8.

EXAMPLE 10
60% $VSb_{1.2}Fe_{0.025}Ni_{0.025}Sn_{0.5}Ti_1O_x$–40% $SiO_2$

A catalyst of composition 60% $VSb_{1.2}Fe_{0.025}Ni_{0.025}Sn_{0.5}Ti_1O_x$–40% $SiO_2$ was prepared in a similar manner to Example 4 with 0.093 g NiO and 0.10 g $Fe_2O_3$, and 0.79 g oxalic acid present during the hydrothermal reaction step (175° C., 16 hrs).

EXAMPLE 11
60% $VSb_{1.2}Mn_{0.025}Sn_{0.5}Ti_1O_x$–40% $SiO_2$

A composition of 60% $VSb_{1.2}Mn_{0.025}Sn_{0.5}Ti_1O_x$–40% $SiO_2$ was prepared in the same manner as in Example 10 except with 0.11 g of $MnO_2$ present.

EXAMPLE 12
60% $VSb_{1.2}Fe_{0.025}Mn_{0.025}Sn_{0.5}Ti_1O_x$–40% $SiO_2$

A composition of 60% $VSb_{1.2}Fe_{0.025}Mn_{0.025}Sn_{0.5}Ti_1O_x$–40% $SiO_2$ was prepared in the same manner as in Example 10 except with 0.12 g $Fe_2O_3$ (Baker) and 0.11 g of $MnO_2$ present.

EXAMPLE 13
60% $VSb_{1.2}Fe_{0.12}Sn_{0.5}Ti_1O_x$–40% $SiO_2$

A catalyst of composition 60% $VSb_{1.2}Fe_{0.12}Sn_{0.5}Ti_1O_x$–40% $SiO_2$ was prepared by reacting a mixture of $V_2O_5$ (4.55 g), $Sb_2O_3$ (8.75 g), $Fe_2O_3$ (Nano, 0.479 g), 18.84 g tin oxide sol (3.77 g $SnO_2$) and 125 ml water were reacted under reflux for ~24 hrs. After cooling, 4.00 g $TiO_2$ and 47.86 g of silica sol (30% solids) were added and the slurry was thickened on a hotplate until the stir bar stopped. The high temperature calcination was at 900° C. for 3 hrs.

EXAMPLE 14
60% $VSb_{1.2}Fe_{0.12}Sn_{0.5}Ti_1O_x$–40% $SiO_2$

A catalyst of composition 60% $VSb_{1.2}Fe_{0.12}Sn_{0.5}Ti_1O_x$–40% $SiO_2$ was prepared by reacting a mixture of $V_2O_5$ (4.55 g), $Sb_2O_3$ (8.75 g), $Fe_2O_3$ (Nano, .479 g), 18.84 g tin oxide sol (3.77 g $SnO_2$) and 120 ml water were reacted at 150° C. under autogenous pressure in a stirred autoclave for 21 hrs. After cooling, 4.00 g $TiO_2$ and 47.86 g of silica sol (30% solids) were added and the slurry was thickened on a hotplate until the stir bar stopped. The high temperature calcination was at 900° C. for 2.5 hrs.

EXAMPLE 15
60% $VSb_{1.2}Fe_{0.12}Sn_{0.5}Ti_1O_x$–40% $SiO_2$

A catalyst of composition 60% $VSb_{1.2}Fe_{0.12}Sn_{0.5}Ti_1O_x$–40% $SiO_2$ was prepared by reacting a mixture of $V_2O_5$ (7.00 g), $Sb_2O_3$ (13.46 g), $Fe_2O_3$ (Nano, 0.74 g), 28.98 g tin oxide sol (5.80 g $SnO_2$) and 112 ml water were reacted at 150° C. under autogenous pressure in a stirred autoclave for 3 hrs. After cooling, 6.15 g $TiO_2$ and 73.62 g of silica sol (30% solids) were added and the slurry was thickened on a hotplate until the stir bar stopped. The high temperature calcination was at 900° C. for 2.5 hrs.

The catalyst of Examples 1 to 15 above were tested under following conditions. The feed ratio for $C_3^=/NH_3/O_2/N_2/H_2O$ in each of the examples was 1.8/2.2/3.9/2.4/6.0, respectively. The results are set forth below in Table I.

TABLE I

| | | | | | Fixed Bed Reactor Tests | | | | | |
| | Temp | CT | % $C_3^=$ | % AN | | | Propylene % Sel to | | | |
| Ex. | °C. | Sec | Conv | Yld | AN | HCN | Aceto | Acrol | Acry Ac | CO | $CO_2$ |
|---|---|---|---|---|---|---|---|---|---|---|---|
| 1 | 465 | 0.91 | 97.91 | 78.88 | 80.56 | 3.92 | 1.80 | 0.81 | 0.41 | 5.25 | 7.25 |
| 2 | 462 | 1.09 | 97.43 | 75.67 | 77.66 | 4.07 | 2.10 | 3.00 | 0.32 | 6.15 | 8.74 |
| 3 | 458 | 0.55 | 97.76 | 75.54 | 77.28 | 5.03 | 1.88 | 0.32 | 0.57 | 7.22 | 7.70 |
| 4 | 460 | 0.57 | 97.27 | 78.02 | 80.21 | 4.28 | 1.95 | 0.75 | 0.98 | 4.92 | 6.92 |
| 5 | 460 | 0.68 | 97.98 | 77.29 | 78.88 | 4.42 | 1.98 | 0.68 | 0.87 | 5.45 | 7.71 |
| 6 | 460 | 0.78 | 98.13 | 77.85 | 79.34 | 4.20 | 2.06 | 0.82 | 0.62 | 5.10 | 7.86 |
| 7 | 458 | 0.61 | 97.67 | 77.73 | 79.59 | 4.39 | 1.97 | 0.59 | 0.72 | 5.46 | 7.28 |
| 8 | 458 | 0.61 | 98.47 | 78.59 | 79.82 | 4.27 | 1.97 | 0.71 | 0.71 | 5.22 | 7.31 |
| 9 | 458 | 0.61 | 98.42 | 77.86 | 79.11 | 4.57 | 1.81 | 0.54 | 0.62 | 5.81 | 7.54 |
| 10 | 458 | 0.60 | 97.88 | 77.71 | 79.40 | 4.34 | 1.70 | 0.58 | 0.79 | 5.75 | 7.45 |
| 11 | 460 | 1.02 | 98.82 | 75.46 | 76.36 | 4.62 | 1.96 | 0.46 | 0.28 | 7.05 | 9.28 |
| 12 | 463 | 1.19 | 97.60 | 77.14 | 79.03 | 4.19 | 2.06 | 0.52 | 0.23 | 5.26 | 8.70 |
| 13 | 460 | 0.79 | 98.44 | 78.68 | 79.93 | 4.43 | 1.93 | 0.48 | 0.45 | 5.61 | 7.18 |
| 14 | 460 | 0.60 | 97.88 | 79.03 | 80.74 | 4.49 | 1.25 | 0.58 | 0.60 | 5.37 | 6.99 |
| 15 | 460 | 0.61 | 98.76 | 79.25 | 80.25 | 4.48 | 1.31 | 0.20 | 0.40 | 5.66 | 7.71 |

Fluid Bed Propylene Ammoxidation

EXAMPLE 1

A large batch of fluid bed catalyst of composition $V_1Sb_{1.2}Fe_{0.12}Sn_{0.5}Ti_1O_x$–40% $SiO_2$ was prepared following a procedure employed to prepare catalyst in Example 13 above. In this case the titania and silica sol were added to the slurry as obtained from the hydrothermal reaction step. The slurry was then concentrated to about 32–33% solids by evaporation of water before spray drying.

EXAMPLE 2

A large batch of fluid bed catalyst of composition $V_1Sb_{1.2}Fe_{0.12}Sn_{0.5}Ti_1O_x$–40% $SiO_2$ was prepared following a procedure employed above except that the slurry obtained from the hydrothermal reaction step was concentrated to 18–20% solids prior to the addition of the titania and silica. The slurry was then concentrated to about ~35% solids by evaporation of water before spray drying.

Examples 1 and 2 were conducted in a 40 cc fluid bed reactor. The feed ratio for $C_3^{32}/NH_3/O_2/N_2/H_2O$ in Examples 1 and 2 was 1.8/2.2/3.9/16, respectively. The results are set forth below in Table II.

EXAMPLE 4

A catalyst of composition $VSb_{1.4}Sn_{0.2}Ti_{0.1}O_x$ was prepared in the following manner:

7.58 g of $V_2O_5$, 17.01 g of $Sb_2O_3$, 0.67 g of fumed $TiO_2$, 27.57 g of an ammonium hydroxide stabilized $SnO_2$ sol containing 2.51 g of $SnO_2$ and approximately 125 g of water were placed in a quartz liner. This liner was then placed and sealed inside a 300 cc autoclave equipped with an overhead stirrer. The mixture was then heated to 125° C. and maintained for 6 hrs with stirring. The heater was then removed from the autoclave and the mixture was left to cool with stirring overnight. The rest of the procedure was the same as for Examples 2 and 3.

EXAMPLE 5

The same procedure as in Example 4 was utilized to prepare a slurry containing the components to prepare a catalyst of composition $VSb_{1.4}Sn_{0.2}Ti_{0.1}O_x$. Upon removal from the cooled autoclave, the slurry was concentrated to 29–30% solids in a beaker on a hotplate. Lithium hydroxide in water was added to reduce the viscosity of the slurry. Water was continued to be evaporated off and a solids

TABLE II

| | | | | | Fluid Bed Reactor Tests | | | | | | |
|---|---|---|---|---|---|---|---|---|---|---|---|
| | Temp | CT | | % $C_3^=$ | % AN | | | Propylene % Sel to | | | |
| Ex. | C. | sec | wwh | conv | Yld | AN | HCN | Aceto | Acrol | Acry Ac | CO | $CO_2$ |
| 1 | 450 | 1.01 | 0.23 | 98.47 | 80.94 | 82.20 | 5.07 | 1.13 | 0.20 | 0.24 | 4.01 | 6.88 |
| 2 | 450 | 0.83 | 0.26 | 98.51 | 80.90 | 82.12 | 5.05 | 1.06 | 0.18 | 0.15 | 4.05 | 7.13 |

Propane Ammoxidation

Comparative Example 1

A catalyst of composition $VSb_{1.4}Sn_{0.2}Ti_{0.1}O_x$ was prepared in a similar manner as described in Example 9 above, except that no iron or $SiO_2$ was added. The catalyst was ultimately calcined at 820° C. for 3 hrs, calcined at 650° C. for 3 hrs and washed with isobutanol.

EXAMPLE 2

A catalyst of composition $VSb_{1.4}Sn_{0.2}Ti_{0.1}O_x$ was prepared in the following manner: 7.58 g of $V_2O_5$, 17.01 g of $Sb_2O_3$ and 27.57 g of $NH_4OH$ stabilized $SnO_2$ sol containing 2.51 g of $SnO_2$ and approximately 125 g of water were placed in a 250 mL roundbottom flask equipped with a condenser. This mixture was refluxed with stirring for 22 hrs. After cooling, the obtained slurry was added to a beaker containing 0.67 g of fumed $TiO_2$ with stirring. After 1 hr, the slurry was concentrated by evaporation until the mixture thickened and placed in a 125° C. oven overnight to dry. The dried solid was heated in air at 290° C. for 3 hrs, then 425° C. for 3 hrs, and then 8 hrs at 650° C. The material was then ground and sieved and a portion of the 20–35 mesh portion was calcined at 820° C. for 3 hrs, then 650° C. for 3 hrs and then washed with isobutanol.

EXAMPLE 3

The same composition as set forth in Example 2 was prepared except that the fumed $TiO_2$ was present during the 24 hrs reflux step.

content of approximately 46% was obtained before the stir bar stopped. The rest of the procedure was similar to above except that the catalyst was calcined in flowing air at 810° C. and 650° C. prior to a single isobutanol washing step after the calcination at 650° C. The resulting catalyst composition was $Li_{0.05}VSb_{1.4}Sn_2Ti_{0.1}O_x$.

EXAMPLE 6

(6 hrs)

The same procedure was employed as in Example 4 except that the final two calcination steps were conducted as in Example 5.

EXAMPLE 7

(4 hrs)

The same procedure was employed as in Example 6 except that the hydrothermal step was only conducted for 4 hrs.

EXAMPLE 8

The same procedure as in Example 4 except that the hydrothermal reaction step was conducted for 4 hrs at 150° C.

The results of the fixed bed reactor tests for propane ammoxidation are set forth below in Table III.

TABLE III

Fixed Bed Reactor Tests

| Ex. | Temp C. | CT sec | % $C_3°$ wwh | % AN conv | Yld | Propane % Sel to |  |  |  | CO | $CO_2$ | C3= | Feed Ratio $C_3/NH_3/O_2/N_2/H_2O$ |
|---|---|---|---|---|---|---|---|---|---|---|---|---|---|
|  |  |  |  |  |  | AN | HCN | Aceto | Acry Ac |  |  |  |  |
| 1 | 470 | 1.89 | 0.03 | 20.56 | 12.15 | 59.09 | 13.52 | 1.74 | 1.30 | 13.76 | 10.04 | 0.54 | 1/1.34/3.51/11.7/3.7 |
| 2 | 470 | 1.89 | 0.04 | 22.83 | 11.78 | 51.58 | 11.17 | 1.11 | 0.44 | 19.11 | 16.26 | 0.33 | 1/1.24/3.33/11.0/3.5 |
| 3 | 470 | 2.27 | 0.04 | 19.50 | 10.99 | 56.38 | 11.47 | 1.19 | 0.00 | 17.04 | 13.61 | 0.31 | 1/1.24/3.33/11.0/3.5 |
| 4 | 470 | 2.27 | 0.04 | 20.61 | 12.37 | 60.04 | 7.46 | 0.93 | 0.00 | 17.79 | 13.35 | 0.41 | 1/1.24/3.33/11.0/3.5 |
| 5 | 480 | 2.08 | 0.11 | 20.17 | 12.86 | 63.75 | 8.86 | 1.56 | 0.04 | 13.15 | 11.85 | 0.48 | 1/1.20/.98/3.27/2 |
| 6 | 480 | 1.66 | 0.13 | 21.89 | 13.70 | 62.59 | 9.22 | 1.62 | 0.04 | 13.81 | 11.74 | 0.56 | 1/1.2/.99/3.3/2 |
| 7 | 480 | 1.88 | 0.15 | 21.61 | 13.35 | 61.80 | 9.38 | 1.55 | 0.03 | 14.16 | 12.19 | 0.47 | 1/1.2/.99/3.29/2 |
| 8 | 470 | 2.42 | 0.04 | 20.61 | 11.29 | 54.58 | 9.27 | 1.16 | 0.52 | 18.70 | 15.31 | 0.46 | 1/1.52/3.0/10.6/3.5 |

The foregoing description is not intended to be exhaustive of the embodiment and combinations of the process the present invention. Although the compositions prepared date have been targeted to ammoxidation catalyst for propane and propylene, it is envisioned that the process will suitable for the preparation of other types of oxidation catalysts. It is intended that the process of the present invention is defined by the appealed claims attached hereto.

What we claim is:

1. A process for the preparation of a catalyst having the following empirical formula:

$$V_a Sb_b M_m N_n O_x$$

where
a=0.01 to 2
b=0.5 to 4
m=0.01 to 3, and
n=0 to 1
where
M=Sn, Ti, Fe, Cu, Mn, Ga or mixtures thereof
N=Li, Mg, Sr, Ca, Ba, Co, Ni, Zn, Ge, Nb, Zr, Mo, W, Cr, Te, Ta, Se, Bi, Ce, In, As, B or mixtures thereof
comprising heating an aqueous mixture consisting essentially of water soluble vanadates, $Sb_2O_3$ and at least one M promoter to a temperature of between about 100° C. to 250° C. under autogenous pressure with agitation for a time sufficient to allow at least the water soluble vanadates and $Sb_2O_3$ and the M promoter to react to form a catalyst precursor, drying said catalyst precursor to remove the water and calcining the catalyst precursor to produce the catalyst.

2. The process of claim 1 further comprising adding at least one promoter N to the aqueous mixture prior to heating the aqueous mixture to form the catalyst precursor.

3. The process of claim 1 further comprising selecting Sn as the M promoter.

4. The process of claim 3 wherein the Sn promoter is added to the aqueous mixture in the form of a tin oxide sol.

5. The process of claim 1 wherein the aqueous mixture is maintained at a pH of greater than 7 by the addition of a base.

6. The process of claim 1 wherein the aqueous mixture is maintained at a pH below 7 by the addition of an acid.

7. The process of claim 2 wherein the promoter N is added after the water soluble vanadate and $Sb_2O_3$ have reacted to form the catalyst precursor and prior to drying and calcination.

8. The process of claim 5 wherein the base is selected from the group consisting of an inorganic or organic amine.

9. The process of claim 8 wherein the base is an organic amine selected from the group consisting of alkylamines, alkanolamines or mixtures thereof.

10. The process of claim 6 wherein the acid is an organic acid.

11. The process of claim 10 wherein the organic acid is selected from the group consisting of acetic, oxalic or mixtures thereof.

12. The process of claim 6 wherein the acid is an inorganic acid.

13. A process for the preparation of a catalyst having the following formula:

$$V_a Sb_b M_m N_n O_x$$

where
a=0.01 to 2
b=0.5 to 4
m=0.01 to 3, and
n=0 to 1
where
M=Sn, Ti, Fe, Cu, Mn, Ga or mixtures thereof
N=Li, Mg, Sr, Ca, Ba, Co, Ni, Zn, Ge, Nb, Zr, Mo, W, Cr, Te, Ta, Se, Bi, Ce, In, As, B or mixtures thereof
comprising heating an aqueous mixture consisting essentially of $V_2O_5$ and $Sb_2O_3$ and at least one M promoter to a temperature of between about 110° to 250° C. under autogenous pressure with mixing for a time sufficient to allow at least $V_2O_5$ and $Sb_2O_3$ to react to form a catalyst precursor, drying the catalyst precursor to remove the water, and calcining the catalyst precursor to produce the catalyst.

14. A process for the preparation of a catalyst having the following empirical formula:

$$V_a Sb_b M_m N_n O_x$$

where
a=0.01 to 2
b=0.5 to 4
m=0.01 to 3, and
n=0 to 1
where
M=Sn, Ti, Fe, Cu, Mn, Ga or mixtures thereof
N=Li, Mg, Sr, Ca, Ba, Co, Ni, Zn, Ge, Nb, Zr, Mo, W, Cr, Te, Ta, Se, Bi, Ce, In, As, B or mixtures thereof
comprising heating an aqueous mixture consisting essentially of water soluble vanadates, $Sb_2O_3$ and a base to a temperature of between about 100° to 250° C. under autogenous pressure with agitation for a time sufficient to allow at least the water soluble vanadates and $Sb_2O_3$ to react to form a catalyst precursor, adding at least one M promoter to the catalyst precursor, drying said catalyst precursor to remove the water and calcining the catalyst precursor to produce the catalyst.

15. The process of claim 14 wherein the M promoter is added to the aqueous mixture prior to heating the mixture to form the catalyst precursor.

16. The process of claim 15 wherein the M promoter is Sn.

17. The process of claim 16 wherein the Sn is added to the aqueous mixture in the form of a tin oxide sol.

18. The process of claim 15 wherein at least one N promoter is added to the aqueous mixture prior to the formation of the catalyst precursor.

19. The process of claim 18 wherein the N promoter is added to the aqueous mixture after the formation of the catalyst precursor.

20. The process of claim 14 wherein the promoter M is added to the aqueous mixture prior to heating to form the catalyst precursor.

* * * * *